United States Patent Office 3,658,747
Patented Apr. 25, 1972

3,658,747
SOLUBLE DYES FOR ANIONICALLY
POLYMERIZED (AP) NYLON
John M. Kolyer, Convent, N.J., assignor to Allied
Chemical Corporation, New York, N.Y.
No Drawing. Continuation-in-part of application Ser. No.
525,827, Feb. 8, 1966. This application Dec. 22, 1969,
Ser. No. 887,351
Int. Cl. C08g 51/66
U.S. Cl. 260—37
16 Claims

ABSTRACT OF THE DISCLOSURE

Composition of polycaproamide and a dyestuff having a color essentially the same as the color of the precursor polymerization mixture, prepared by anionic polymerization of caprolactam in the presence of specific soluble dyes.

---

This application is a continuation-in-part of my co-pending U.S. application Ser. No. 525,827, filed Feb. 8, 1966 and now abandoned.

This invention relates to the use of certain $\epsilon$-caprolactam-soluble dyes in anionically polymerized (AP) nylon.

The past practice in coloring AP nylon has been to disperse insoluble inorganic or organic pigments in the $\epsilon$-caprolactam prior to polymerization.

The prior art procedures were unsatisfactory for the following reasons:

(a) Expensive milling equipment had to be purchased for the dispersion;

(b) A surface active agent was sometimes required to effect the dispersion, the presence of which tended to give undesired results, such as discoloration and interference with "cure";

(c) The use of the pigment tended to make the polymer brittle; and (d) Voids tended to occur because of imperfect wetting of the pigment by the monomer and by the consequent polymer.

An object of the present invention is to color AP nylon by the use of $\epsilon$-caprolactam-soluble dyes. Many dyes change in color due to reaction with the anionic catalyst. Since it is essential to anticipate the color to be produced in the nylon, the dye when dissolved in $\epsilon$-caprolactam containing the anionic catalyst should produce the final color of anionically polymerized nylon containing this dye. Therefore, another object of this invention is to provide dyes which give colors in the final anionically polymerized nylon which match those in pure $\epsilon$-caprolactam.

These and other objects are accomplished according to this invention, wherein a number of soluble dyes are introduced into AP nylon by dissolving the dye in $\epsilon$-caprolactam and then polymerizing according to standard procedures.

The anionic polymerization of $\epsilon$-caprolactam is well known and proceeds by incorporating a basic metal catalyst into the monomer lactam and heating. Suitable catalysts for the polymerization include the alkali metals, such as lithium, sodium and potassium and the like and the alkaline earth metals such as calcium, barium, magnesium, strontium and the like. In addition to elemental metal, the catalysts are effective in the form of their metal hydrides, oxides, hydroxides, carbonates, alkyls, aryls, amides and organic acid salts. Such compounds include, for example, sodium hydroxide, magnesium hydroxide, lithium hydride, potassium methoxide, lithium ethyl, potassium naphthyl, sodamide, and the like. The amount of catalyst employed can vary from about 0.01 up to about 20% by weight of the monomer, depending upon the rate of polymerization and the molecular weight of the polymer desired. When lithium hydride is employed as catalyst, preferably about 0.02 up to about 0.2% by weight of the catalyst will be employed.

The rate of polymerization can be modified by adding a cocatalyst promoter. Catalyst-promoter systems for anionically polymerizing lactam are well known, being disclosed for example in U.S. Pats. 3,017,391; 3,017,-392; 3,018,273; 3,086,962; 3,028,369; and 3,309,393; Allied Chemical Corporation's French Pat. 1,349,953 granted Dec. 16, 1963; and ICI's British Patent 924,453, published Apr. 24, 1963. Suitable cocatalyst promoters include N-substituted imides such as N-acetyl caprolactam, N-benzoyl caprolactam, N-ethylcarbamyl caprolactam and the like; cyclic imides of dicarboxylic acids such as N-phenylsuccinimide, N-methylsuccinimide, N-methylphthalimide and the like; polyimides such as N,N',N''-trimethylester of isocyanuric acid, ethylenedisuccinimide and the like; and other nitrogen-containing compounds such as 1,3,5-triphenoxy-s-triazine, diphenylcarbamyl imidazole, 1,1' - terephthaloylbis(pyrazole), dicaprolactam ether and the like. The amount of cocatalyst employed can vary from about 0.1 to 5 mol percent of the monomer, as is known.

We have found that certain soluble dyestuffs when added to caprolactam and polymerized anionically, do not react with the anionic catalyst, do not interfere with the polymerization reaction and do not change color, either during the course of polymerization, nor in subjecting the resultant polymer to water washing. This is important to ensure reproducibility in the color of the final polymer. The suitability of a particular dye for use in the anionic polymerization of caprolactam can only be determined by empirical methods, and cannot be predicted, whether based on the structure of the dyestuff, whether it is known as a dye for plastics, fabrics or foodstuffs, whether it is resistant to alkali solutions or other criteria presently known.

The temperature of the lactam-catalyst reaction mixture prior to adding in the dye is usually about 70° to 140° C. and preferably from 75°–105° C. to avoid premature polymerization. The polymerization temperature is in the range from 140° C. to 200° C., preferably from 150° C. to 180° C. The promoter can be present prior to adding the dye; or can be mixed with lactam, catalyst and dye as a hot solution in lactam at up to about 250° C. thereby forming a polymerization reaction mixture of 140°–200° C. temperature.

The dye concentration may range from .01% to 1%, by weight, but 0.1% is preferable on the basis of giving a strong, yet economical coloring. Above 1% there is no increase in color intensity. Below .01% the coloring is too pale for commercial application.

In a preferred mode of operation the dyestuff is dissolved in ε-caprolactam containing an anionic catalyst for ε-caprolactam polymerization but free of polymerization promoter, at a temperature in the range 75° C.–105° C. This solution is charged to a heated mold and mixed therein with about an equal volume of a more highly heated ε-caprolactam solution of the promoter. This forms an ε-caprolactam-catalyst-promoter reaction mixture containing dissolved dyestuff at a temperature of 140°–200° C. in the mold. By this procedure, uniformly colored molded articles can be obtained.

Although the above discussion has referred to dyestuff dissolved in ε-caprolactam and in polycaproamide alone, my invention is applicable in the same manner to copolymer compositions containing ε-caprolactam in major proportion by weight along with other copolymerizable lactams, in particular lactams containing 7–12 carbon atoms in the ring, such as enantholactam, caprylolactam and laurolactam as well as analogous bis-lactams such as isopropylidene-bis-ε-caprolactam. Such copolymers are intended to be include within the scope of the term "polycaproamide."

The compositions of my invention are useful generally in AP nylon, e.g., in castings.

The invention will be further illustrated by the following examples but it is to be understood that the invention is not meant to be limited to the details described therein. In the examples all parts and percentages are by weight.

EXAMPLE 1

A polymerization reaction mixture was prepared from an "A" mixture (prepared by reacting 0.60 part of lithium hydride with 500 parts of dry (less than 50 p.p.m. water) ε-caprolactam at 95° C. for 4 hours), and a "B" mixture (prepared by dissolving 2.50 parts of triphenoxy-s-triazine in 500 parts of ε-caprolactam at ordinary temperatures).

0.010 gram of a red ε-caprolactam-soluble dye, Food Red 1 (Color Index No. 14700) which is the disodium salt of 2-(5-sulfo-2,4-xylylazo)-1-naphthol-4 - sulfonic acid was brought to 160°–165° C. in a test tube immersed in an oil-bath, under a nitrogen protective atmosphere.

5.0 grams of mixture "B" were added at 100° C. to 5.0 grams of freshly prepared mixture "A," also at 100° C., and this was poured into the container of dye. The polymerization reaction then proceeded with the oil-bath at 160°–165° C. The dye dissolved immediately and the dyed liquid gelled in 4–6 minutes. Nearly complete polymerization was indicated at 9–13 minutes as the gel contracted and broke away from the walls of the tube. The color of the nylon was observed to be true to that red obtained when the pigment was dissolved in ε-caprolactam containing the catalyst and this color was retained after the polymer had cooled.

The solid polycaproamide, colored by soluble dyestuff in accordance with this invention, apparently contained the dyestuff in dissolved form since a thin section of polymer when viewed under a microscope showed no distinct dye particles.

EXAMPLES 2–44

Other successful dyes are given in Table I below. All runs were made as per Example 1. In all cases, the color of the dyed polymer was the same as the color of the solution of the dye in the catalyzed and promoted ε-caprolactam.

TABLE I.—DYES THAT ARE SUITABLE IN AP NYLON

| | Dyes | Color Index Number | C.I. name | Dye class |
|---|---|---|---|---|
| 1 | FD and C Red #4 | 14700 | Food Red 1 | Monoazo. |
| 2 | D and C Red #33 | 17200 | Acid Red 33 | Do. |
| 3 | Fast Light Yellow 2G | 18965 | Acid Yellow 17 | Do. |
| 4 | Milling Yellow NGS | 23900 | Acid Yellow 44 | Disazo. |
| 5 | Chinoline Yellow D (sol. in spirits) | 47000 | Solvent Yellow 33 | Quinoline. |
| 6 | Wool Yellow extra conc., 118% (classical name: Tartrazine). | 19140 | Acid Yellow 23 | Monoazo. |
| 7 | Solantine Turquoise G | 74180 | Direct Blue 86 | Phthalocyanine. |
| 8 | Niagara Sky Blue 6B | 24410 | Direct Blue 1 | Disazo. |
| 9 | Direct Rayon Black KSG | 35255 | Acid Black 19 | Azo. |
| 10 | Chromolan Black NWA | 15711 | Acid Black 52 | Monoazo. |
| 11 | Ext. D and C Red #1 | 18055 | Acid Violet 7 | Do. |
| 12 | Brilliant Milling Red 3B | 18135 | Acid Red 172 | Do. |
| 13 | Fast Crimson 6BL | 18055 | Acid Violet 7 | Do. |
| 14 | Niagara Blue RW | 24280 | Direct Blue 22 | Diszao. |
| 15 | Diazine Brown AD | 31505 | Direct Brown 132 | Azo Trisazo. |
| 16 | Bismarck Brown Y | 21000 | Basic Brown 1 | Azo Disazo. |
| 17 | Bismarck Brown RX Base | 21010B | Solvent Brown 12 | Do. |
| 18 | Plasto Red Brown NR (National Aniline) | | Solvent Brown 16 | Anthraquinone. |
| 19 | D and C Green #5 | 61570 | Acid Green 25 | Do. |
| 20 | D and C Green #5 (.025%) | 61570 | do | Do. |
| 21 | D and C Green #7 | 42100 | Acid Green 9 | Triaryl methane. |
| 22 | Milling Black B | | Acid Black 26 | Disazo. |
| 23 | FD and C Yellow #5 (aluminum lake) | 19140 | Food Yellow 4, Acid Yellow 23. | Monoazo. |
| 24 | Fast Wool Yellow 3GL | 18890 | Acid Yellow 34 | Do. |
| 25 | Fast Light Yellow 2GML | 18900 | Acid Yellow 29 | Do. |
| 26 | Plasto Yellow MGS | | Solvent Yellow 40 | |
| 27 | D and C Orange #16 | 45371 | Solvent Orange 18 | Xanthene. |
| 28 | Ext. D and C Orange #4 | 12100 | Solvent Orange 2 | |
| 29 | Diazine Scarlet R | | Direct Red 118 | Monoazo. |
| 30 | Canary Lake Yellow PL | | Acid Yellow 60 | Do. |
| 31 | Niagara Fast Copper Blue R | | Direct Blue 162 | Polyazo. |
| 32 | Niagara Sky Blue | 24400 | Direct Blue 15 | Disazo. |
| 33 | Niagara Navy Blue BW | | Direct Blue 24 | Trisazo. |
| 34 | Niagara Blue NR | | Direct Blue 52 | Do. |
| 35 | Niagara Copper Black Brown | | Direct Brown 163 | Do. |
| 36 | FD and C Blue #2 | 73015 | Food Blue 1, Acid Blue 74. | Indigoid. |

TABLE 1—Continued

| Dyes | Color Index Number | C.I. name | Dye class |
|---|---|---|---|
| 37. Neutral Black BSS [1] | | | |
| 38. Lanamid Black BGL [2] | | | |
| 39. Brilliant Blue BFL | 27940 | Direct Blue 55 | Disazo. |
| 40. Naphthol Yellow S | 10316 | Food Yellow 1 | Nitro. |
| 41. Niagara Brilliant Blue BFL | 27940 | Direct Blue 55 | Disazo. |
| 42. D and C Green #5 | 61570 | Acid Green 25 | Anthraquinone. |
| 43. Brilliant Green B | 42040 | Pigment Green 15 | |
| 44. Niagara Fast Copper Bordeaux BGL | | Direct Red 178 | Trisazo. |

[1]
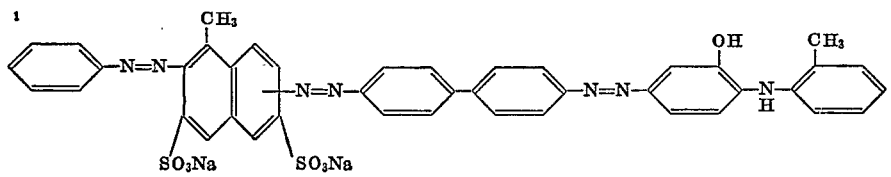

[2] Chrome chelated product of a mixture of 65% A and 35% B.

A is:
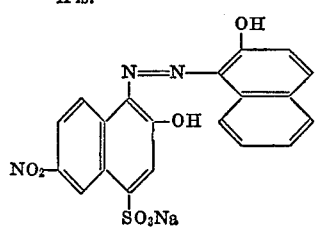

B is:
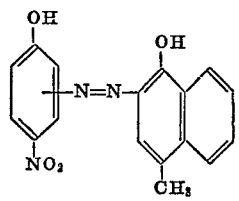

Well over 100 dyes, similarly tested, were found ineffective: that is, (1) an ε-caprolactam solution of the dye changed color when a catalyst was added; (2) a color developed in the polymer which was not true to the color of the solution of the dye in ε-caprolactam; (3) a change in color developed when the polymer was allowed to cool and stand; or (4) a change in color developed when the polymer was washed with water. For example, dyestuffs of the same Color Index class as the effective dyestuffs but which are ineffective, include FD & C Red #1, a monoazo dye, Milling Yellow 0, a disazo dye, Ext. D & C Violet #2, an anthraquinone dye, Diazine Scarlet RWD, a trisazo dye, Rhodamine 6G, a xanthene dye, and Victoria Pure Blue BO Base, a triarylmethane dye.

I claim:

1. Solid poly-ε-caproamide having a dyestuff in solution therein, said dyestuff being selected from the group consisting of FD & C Red #4, D & C Red #33, Fast Light Yellow 2G, Milling Yellow NGS, Chinoline Yellow D, Wool Yellow Extra Conc., 118% (Tartrazine), Solantine Turquoise G, Niagara Sky Blue 6B, Direct Rayon Black KSG, Chromolan Black NWA, Ext. D & C Red #1, Brilliant Milling Red 3B, Fast Crimson 6BL, Niagara Blue RW, Diazine Brown AD, Bismarck Brown Y, Bismarck Brown RX Base, Plasto Red Brown NR, D & C Green #5, D & C Green #7, Milling Black FD & C Yellow #5, Fast Wool Yellow 3GL, Fast Light Yellow 2GML, Plasto Yellow MGS, D & C Orange #16, Ext. D & C Orange #4, Diazine Scarlet R, Canary Lake Yellow PL, Niagara Fast Copper Blue R, Niagara Sky Blue, Niagara Navy Blue BW, Niagara Blue NR, Niagara Copper Black Brown, FD & C Blue #2, Neutral Black BSS, Lanamid Black BGL, Brilliant Blue BFL, Naphthol Yellow S, Niagara Brilliant Blue BFL, D & C Green #5, Brilliant Green B and Niagara Fast Copper Bordeaux BGL, and being characterized by imparting the same color to molten ε-caprolactam when in solution therein as it does to said solid polycaproamide, said polycaproamide being produced by anionically catalyzed, promoted polymerization of ε-caprolactam containing the dissolved dyestuff at a temperature in the range from 140° C. to 200° C., the dye concentration in the polymer being in the range from 0.01% to 1% by weight.

2. Composition of claim 1 wherein said dyestuff is FD & C Red #4.

3. Composition of claim 1 wherein said dyestuff is Tartrazine.

4. Composition of claim 1 wherein said dyestuff is Solantine Turquoise G.

5. Composition of claim 1 wherein said dyestuff is Chromolan Black NWA.

6. Process for preparing uniformly colored solid poly-ε-caproamide which comprises forming a solution of a dyestuff in a polymerization reaction mixture of ε-caprolactam, anionic catalyst for polymerization of the lactam, and promoter for the polymerization at a dyestuff concentration of 0.01% to 1% by weight of the reaction mixture, said solution being at a temperature in the range 70° C.–200° C.; and heating said solution at a temperature in the range from 140° C. to 200° C. whereby the ε-caprolactam is polymerized to solid polymer; said dye being selected from the group consisting of FD & C Red #4, D & C Red #33, Fast Light Yellow 2G, Milling Yellow NGS, Chinoline Yellow D, Wool Yellow Extra Conc., 118% (Tartrazine), Solantine Turquoise G, Niagara Sky Blue 6B, Direct Rayon Black KSG, Chromolan Black NWA, Ext. D & C Red #1, Brilliant Milling Red 3B, Fast Crimson 6BL, Niagara Blue RW, Diazine Brown AD, Bismarck Brown Y, Bismarck Brown RX Base, Plasto Red Brown NR; D & C Green #5, D & C Green #7, Milling Black B, FD & C Yellow #5, Fast Wool Yellow 3BL, Fast Light Yellow 2GML, Plasto Yellow MGS, D & C Orange #16, Ext. D & C Orange #4, Diazine Scarlet R, Canary Lake Yellow PL, Niagara Fast Copper Blue S, Niagara Sky Blue, Niagara Navy Blue BW, Niagara Blue NR, Niagara Copper Black Brown, FD & C Blue #2, Neutral Black BSS, Lanamid Black BGL, Brilliant Blue BFL, Naphthol Yellow S, Niagara Brilliant Blue BFL, D & C Green #5, Brillian Green B and Niagara Fast Copper Bordeaux BGL, and being characterized by imparting the same color to said polymer as is imparted to a solution thereof in molten ε-caprolactam.

7. Process of claim 6 wherein said dyestuff is FD & C Red #4.

8. Process of claim 6 wherein said dyestuff is Tartrazine.

9. Process of claim 6 wherein said dyestuff is Solantine Turquoise G.

10. Process of claim 6 wherein said dyestuff is Chromolan Black NWA.

11. Process of claim 6 wherein said dyestuff is dissolved in ε-caprolactam containing an anionic polymerization catalyst but free of promoter, the solution being at a temperature in the range of 75° C.—105° C.; and the resulting solution is mixed in a mold with a hot ε-caprolactam solution of triphenoxy-s-triazine to form a reaction mixture at 140° C. to 200° C.

12. A molded article of the composition of claim 1.
13. A molded article of the composition of claim 2.
14. A molded article of the composition of claim 3.
15. A molded article of the composition of claim 4.
16. A molded article of the composition of claim 5.

References Cited

UNITED STATES PATENTS

| | | | |
|---|---|---|---|
| 3,017,391 | 1/1962 | Mottus | 260—78 |
| 3,309,343 | 3/1967 | Darnell | 260—78 |
| 3,342,784 | 9/1967 | Gehm | 260—78 |

OTHER REFERENCES

"Preparation and Dyeing of Synthetic Fibers" by H. U. Schmidlin, translated by W. Meitner and A. F. Kertess, 1963, p. 231. Colour Index, 2nd edition 1956, vol. I, pp. 1001, 1013, 1023, 1318, 1395, vol. II, pp. 2179, 2201, 2308, vol. III, p. 4011.

MORRIS LIEBMAN, Primary Examiner

P. R. MICHL, Assistant Examiner